(12) United States Patent
Mittelstadt et al.

(10) Patent No.: US 10,439,341 B2
(45) Date of Patent: *Oct. 8, 2019

(54) HYBRID NEUTRAL PLUG ON BAR WITH DISTRIBUTED PITCH

(71) Applicant: SCHNEIDER ELECTRIC USA, INC., Andover, MA (US)

(72) Inventors: Chad Mittelstadt, Cedar Rapids, IA (US); William Broghammer, Anamosa, IA (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,491

(22) Filed: Mar. 23, 2018

(65) Prior Publication Data

US 2018/0212380 A1  Jul. 26, 2018

Related U.S. Application Data

(63) Continuation of application No. 15/113,148, filed as application No. PCT/US2014/015044 on Feb. 6, 2014, now Pat. No. 9,948,043.

(51) Int. Cl.
*H02B 1/00* (2006.01)
*H01R 25/16* (2006.01)
(Continued)

(52) U.S. Cl.
CPC ............... *H01R 25/16* (2013.01); *H01R 4/36* (2013.01); *H01R 25/14* (2013.01); *H02B 1/04* (2013.01);
(Continued)

(58) Field of Classification Search
CPC .......... H01R 25/16; H01R 4/36; H01H 71/08; H02B 1/056; H02B 1/20; H02B 1/04
See application file for complete search history.

(56) References Cited

U.S. PATENT DOCUMENTS 2,967,287 A * 1/1961 Sori ......................... H01R 4/36
439/724
3,668,591 A    6/1972 Kobryner
(Continued)

OTHER PUBLICATIONS

Extended European Search Report for Application No. 14881973. 3-1807 / 3103170 PCT/US2014015044 dated Aug. 31, 2017.
(Continued)

*Primary Examiner* — Pete T Lee
(74) *Attorney, Agent, or Firm* — Locke Lord LLP

(57) ABSTRACT

A neutral bus bar 150 is provided for an electrical distribution apparatus, such as an electrical panel 100. The neutral bus bar includes an elongated body 152 that includes a plurality of wire connectors 154 and plug-on neutral landing sections 156 distributed along a length of the body. Each wire connector includes a side hole 172 and a top landing hole 184 on the body. The top landing hole can receive a hold down screw 176 to secure an electrical wire received in the side hole 172 from a wire-type circuit breaker. Each plug-on neutral landing section is able to receive a plug-on neutral clip from a plug-on neutral type circuit breaker. Adjacent plug-on neutral landing sections have at least one wire connector arranged therebetween on the body. The plug-on neutral landing sections are also distributed with a pitch spacing that corresponds to a pole spacing of circuit breakers connectable on the electrical distribution apparatus.

20 Claims, 6 Drawing Sheets

(51) Int. Cl.
    *H02B 1/056*     (2006.01)
    *H01R 4/36*     (2006.01)
    *H01R 25/14*     (2006.01)
    *H02B 1/04*     (2006.01)
    *H01H 71/08*     (2006.01)
    *H02B 1/20*     (2006.01)

(52) U.S. Cl.
    CPC ............. *H02B 1/056* (2013.01); *H01H 71/08* (2013.01); *H02B 1/20* (2013.01)

(56) References Cited

U.S. PATENT DOCUMENTS

| | | | |
|---|---|---|---|
| 4,167,768 A * | 9/1979 | Baker | H02B 1/056 361/634 |
| 4,536,823 A * | 8/1985 | Ingram | H02B 1/04 361/637 |
| 5,784,250 A | 7/1998 | Rose | |
| 5,786,982 A | 7/1998 | Rose et al. | |
| 6,036,542 A | 3/2000 | Montague et al. | |
| D454,339 S | 3/2002 | Pickens | |
| 7,387,547 B1 | 6/2008 | Fuzetti | |
| 7,449,645 B1 | 11/2008 | Flegel | |
| 7,957,122 B2 | 6/2011 | Sharp | |
| 2006/0063437 A1 | 3/2006 | Hay | |
| 2012/0264327 A1 | 10/2012 | Carnevale et al. | |
| 2013/0164961 A1 | 6/2013 | Diaz | |

OTHER PUBLICATIONS

International Search Report and Written Opinion dated May 30, 2014 in PCT/US2014/015044 12 pgs.
Eaton Corporation Brochure, "Type CH Arc Fault Circuit Breakers and Loadcenters", Publication No. PA00402003E, Oct. 2011, 2 pgs.
Eaton Corporation Brochure, "Type CH Loadcentre with Plug-on Neutral", Publication No. BR 31A 01 S.K., Apr. 2011, 6 pgs.

* cited by examiner

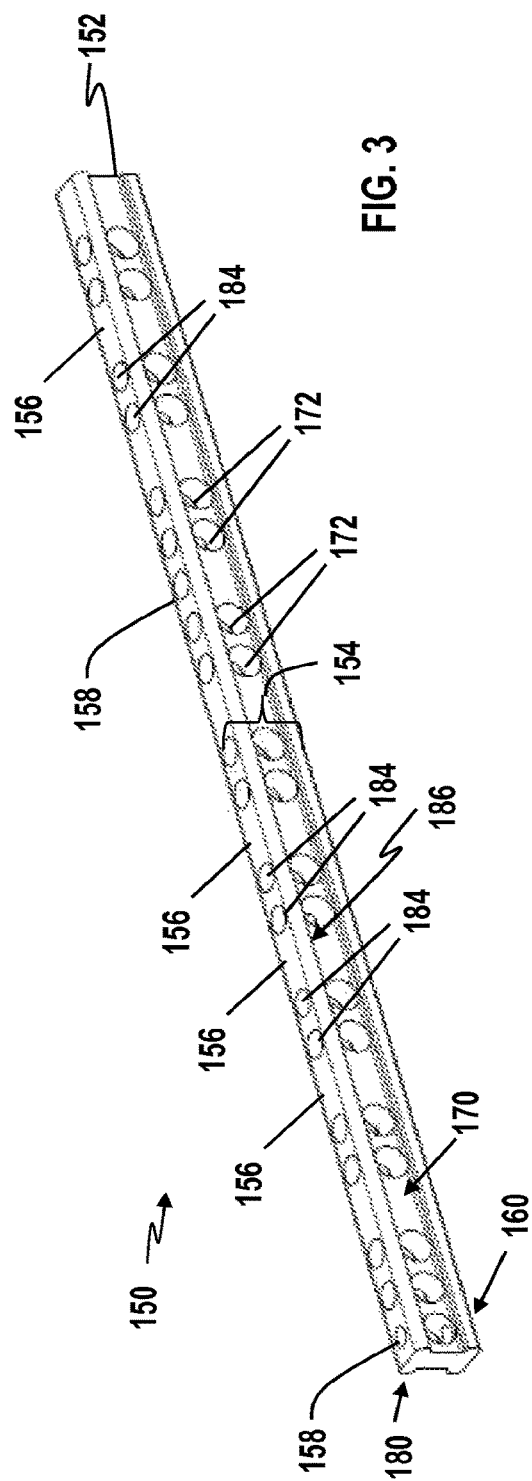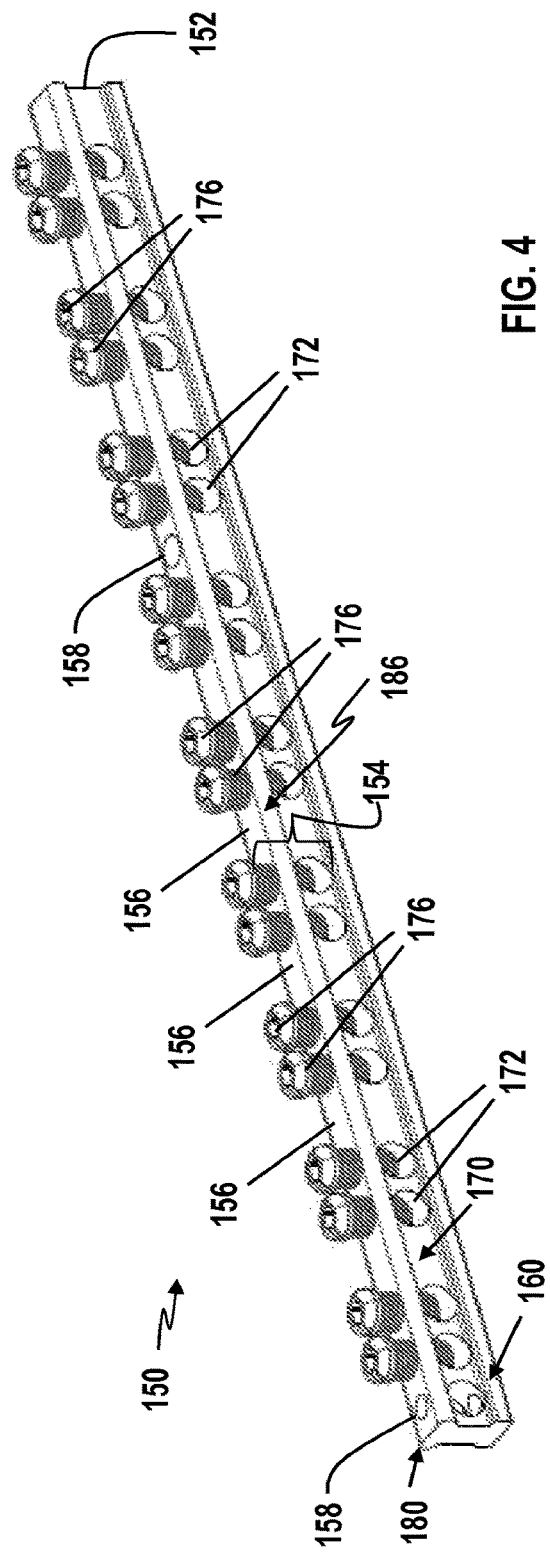

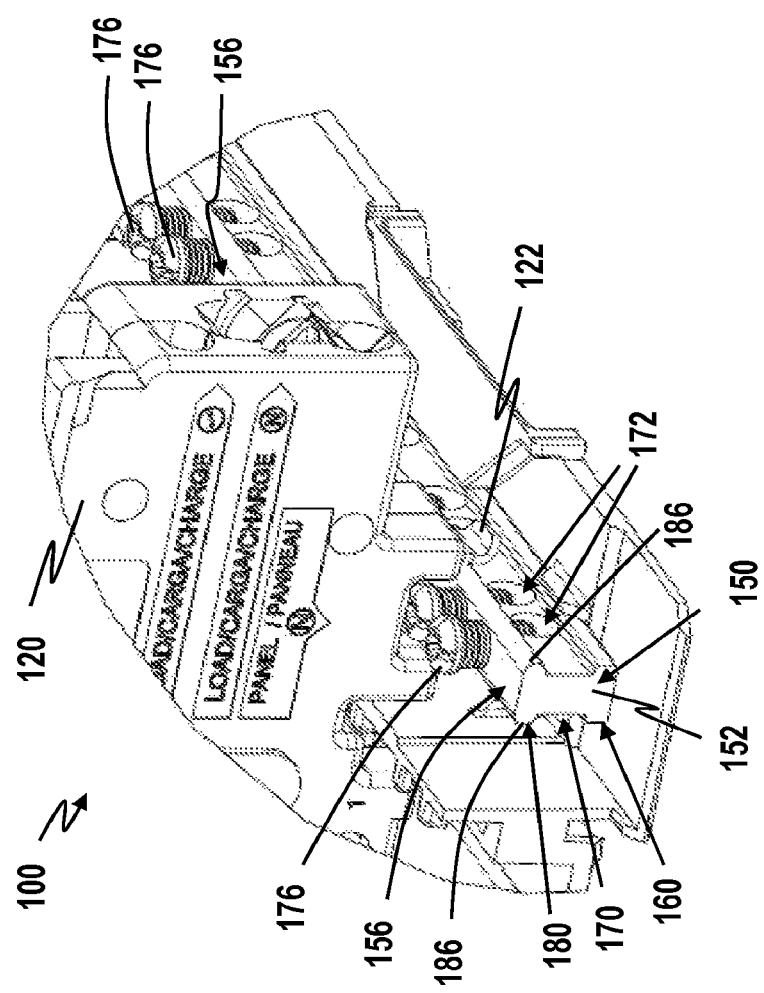
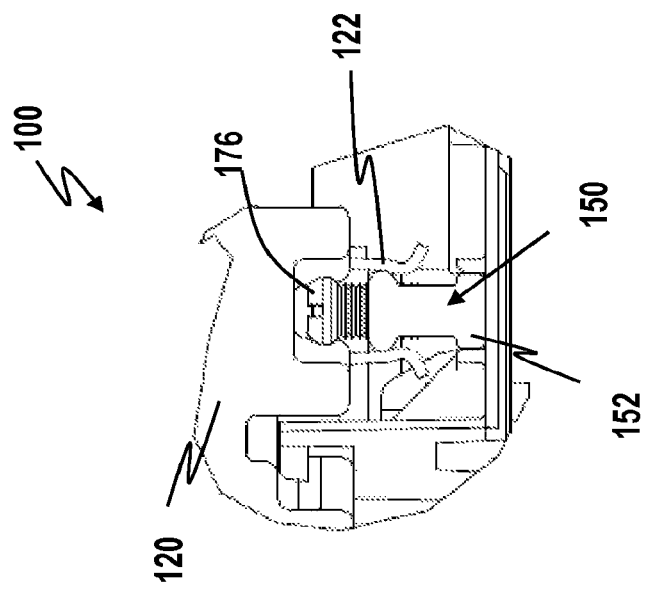
FIG. 5
FIG. 6

HYBRID NEUTRAL PLUG ON BAR WITH DISTRIBUTED PITCH

The present U.S. Patent Application is a continuation of co-pending U.S. patent application Ser. No. 15/113,148, filed Jul. 21, 2016, which claims priority to PCT/US2014/015044, filed Feb. 6, 2014, of which the entire contents of each of the aforementioned applications are herein expressly incorporated by reference.

FIELD

The present disclosure relates to the field of neutral bus bars for an electrical panel, and more particularly, to a hybrid neutral bus bar which is able to accommodate a plug-on neutral connection or a neutral wire connection used by different types of circuit breakers.

BACKGROUND

Arc-fault interruption (AFI) and ground-fault interruption (GFI) circuit breakers are well known. Such circuit breakers have traditionally required an extra conductor, called a "pigtail," or neutral to connect the breaker to a neutral conductor of an electrical distribution panel or load center (these terms are used interchangeably herein). Increased use of arc-fault circuit breakers in a residential load center results in additional pigtails crowding the wiring gutter of the load center, making it more difficult to wire as more circuit breakers are added and creating a jumble of wires. Furthermore, to wire the pigtail, the installer must connect the wire at the side neutral conductor using a tool, thereby making the wiring more time consuming.

More recently, AFI and GFI circuit breakers feature a "plug-on neutral" (PON or PoN), which replaces the pigtail, and allows the circuit breaker to be "plugged onto" the neutral bus bar directly. Instead of a pigtail, the circuit breaker has a connector called a plug-on neutral (PON) clip that directly plugs onto the neutral conductor of the electrical distribution panel. The PON clip typically faces downward away from a bottom surface of the plug-on neutral type circuit breaker so that it is oriented to be plugged directly onto a neutral conductor in the electrical distribution panel. However, certain disadvantages remain when accommodating plug-on neutral type circuit breakers as well as pigtail circuit breakers in the same panel because both circuit breaker types are widely used.

For example, one known type of hybrid neutral bus bar utilizes a square screw down rail, which has a flat and even top surface with minimally spaced wire landing holes for receiving hold down screws for use with a wire type circuit breaker or on which to secure a plug-on neutral clip of a PON type circuit breaker. In order to make a plug-on neutral connection any screw below the PON clip must either be removed or tightened completely to avoid incidental damage to the PON clip if it is removed in a typical rotary fashion. In addition, to plug on over a hold down screw, the PON type circuit breaker must be designed with an overly large PON clip that does not install in a familiar revolute motion. Furthermore, the referenced square rail neutral bus bar is designed with minimally spaced wire landing holes to place as many wire landing holes and hold down screws on the neutral bus bar. However, the wire landing holes are not matched in any way to the pole spacing for circuit breakers connectable onto an electrical distribution panel. As a consequence, the neutral bus bar number of wire landing holes significantly exceeds the requirement for hold down screws, which makes it difficult to trace the circuit breakers on the panel to their connection point on the neutral bus bar.

SUMMARY

A neutral bus bar for an electrical distribution apparatus, such as an electrical panel (e.g., a load center or panel board), is disclosed which can support both a plug-on neutral connection and a wire connection for a circuit breaker or other electrical devices connected on the panel. The neutral bus bar includes an elongated body, which has a plurality of wire connectors distributed along a length of the body. Each of the wire connectors includes a side hole on the body for receiving a wire (e.g., the pigtail coiled neutral wire) from a neutral-wire type circuit breaker or load neutral wire from a typical thermal magnetic circuit breaker, and a top landing hole with a threaded bore on the body for receiving a hold down screw to secure a received electrical wire in the side hole. The top landing hole includes a mouth which opens onto a top surface of the top portion of the elongated body. The elongated body also includes a plurality of plug-on neutral (PON) landing sections distributed along a length of the top portion of the elongated body and segregated from the wire connector sections. Each PON landing section is configured to receive a plug-on neutral (PON) clip from a plug-on neutral type circuit breaker, and is segregated from the wire connectors, particularly their top landings holes. The neutral bus bar is designed with at least one wire connector between adjacent PON landing sections on the elongated body. Thus, the PON clip of the plug-on neutral type circuit breaker can be connected onto a PON landing section, without having to plug over a hold down screw or to remove hold down screws. Accordingly, a shorter PON clip can be used with plug-on neutral type circuit breakers. Each PON landing section of the neutral bus bar may also have rounded or curved edge(s) to provide a shape which improves physical and electrical plug-on connection of the PON clip from a plug-on neutral type circuit breaker onto the neutral bus bar.

The pitch spacing of the PON landing sections is also configured to correspond with the pole spacing of circuit breakers connectable thereto on the electrical panel. For example, the PON landing sections are distributed along a length of the elongated body with a pitch spacing that matches or is aligned with the pole spacing of the circuit breakers connectable on the electrical panel (e.g., ¾ inch, 1 inch, 1 and ½ inch, etc.). By designing the pitch spacing of the PON landing sections to correspond with the pole spacing of circuit breakers connectable on the electrical panel, the wire connector(s) (particularly their top landing holes) between adjacent PON landing sections also have a pitch spacing relative to the pole spacing of the circuit breakers. Thus, it easier to trace the neutral connection points for the circuit breakers on the electrical panel. Furthermore, the neutral bus bar can be designed with a reduced number of wire connectors and hold down screws, which simplifies the manufacturing process by reducing drilling and tapping machining operations and reduces overall costs. The neutral bus bar could be retrofitted onto existing electrical panels and used with existing pig tail breakers or newer plug on neutral type breakers.

Furthermore, the neutral bus bar can be designed with a repeating pattern of a combination of one PON landing section and one or more wire connectors along a length of the neutral bus bar. For example, the pattern can be one PON landing section and two wire connectors. The neutral bus bar can have the pattern repeat at a uniform pitch spacing (e.g., evenly spaced) that corresponds to the pole spacing of the circuit breakers connectable on the electrical panel.

BRIEF DESCRIPTION OF THE DRAWINGS

The description of the various exemplary embodiments is explained in conjunction with the appended drawings, in which:

FIG. 3 illustrates a perspective view of one of the neutral bus bars of FIG. 1.

FIG. 4 illustrates a perspective view of the neutral bus bar of FIG. 3 with hold down screws inserted in the top landing holes of the wire connectors.

FIG. 5 illustrates a partial perspective view of one of the neutral bus bars on the electrical panel of FIG. 1.

FIG. 6 illustrates a partial end view of one of the neutral bus bars on the electrical panel of FIG. 1.

DETAILED DESCRIPTION

Figure 1:
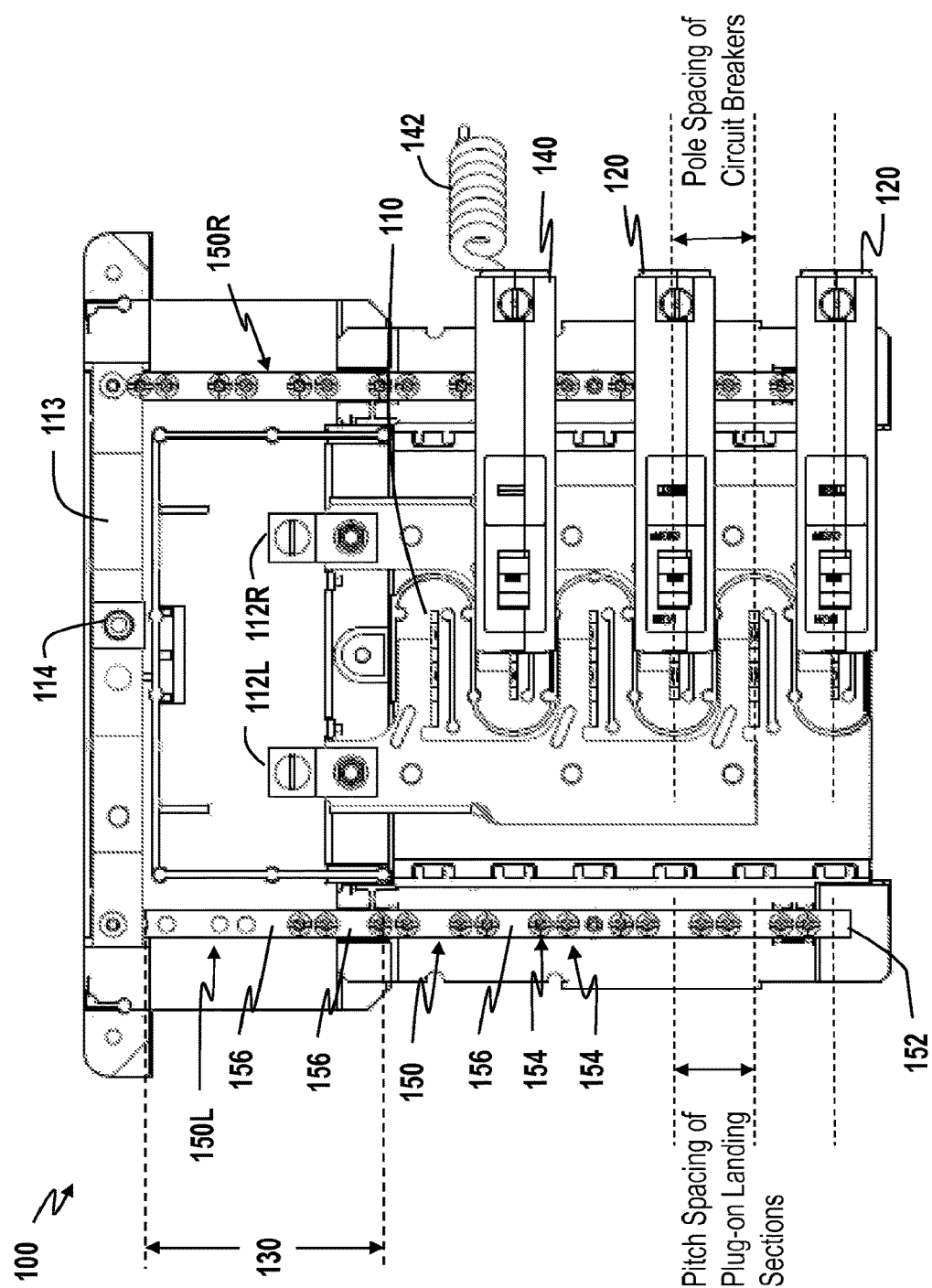
FIG. 1 illustrates a front view of an electrical panel having line and neutral bus bars installed on the left side and the right side of the panel and circuit breakers connected to the bus bars.

Referring to FIG. 1, a front view is shown of an interior of an electrical panel 100 (also referred to as an "electrical distribution panel"), such as a panel board or residential load center. The electrical panel 100 has installed thereon neutral bus bars 150L and 150R (collectively 150, where L refers to a left side of the electrical panel 100 and R refers to a right side of the electrical panel 100). The electrical panel 100 is arranged to receive side-by-side circuit breakers in two parallel rows on left and right sides of the electrical panel 100. In a center section of the electrical panel 100, panel connectors 110, also called stabs, engage corresponding conventional plug-on line clip or jaw connectors (not shown) of each of the circuit breakers and connect the circuit breakers to a line current that is carried through first lines 112L and second lines 112R (collectively, 112). In the illustrated embodiment, the panel connectors 110 electrically engage either the first line 112L, or the second line 112R. Fewer or more lines can be used. One neutral bus bar 150R is provided along a right-hand side (from the perspective of an observer looking at the front of the electrical panel 100) of the interior of the electrical panel 100. A second neutral bus bar 150L is provided along a left-hand side of the interior of the electrical panel 100. The neutral bus bars 150 are made of an electrically conductive material, such as copper or aluminum, and are electrically engaged with a panel neutral or load-side neutral 114. "Line-side" refers to conductors and connections upstream of the circuit breakers toward the source of line current, as opposed to load-side, which refers to conductors and connections downstream of the circuit breakers toward the load(s) being protected by the circuit breakers.

Circuit breakers of various types can be installed into the electrical panel 100. For example, the circuit breakers can include any combination of a plug-on neutral type circuit breaker 120 (e.g., a Plug On Neutral or PON circuit breaker) or a wire type circuit breaker 140 (e.g., a pigtail-neutral circuit breaker). Some wire type circuit breakers can have a neutral wire 142 (called a pigtail due to its curly configuration) that is manually fastened to the neutral bus bar 150 within the electrical panel 100 to connect the circuit breaker to the load-side neutral 114. Such circuit breakers bearing an electrical wire for their panel neutral connection may or may not have a connector in the form of a protruding mounting jaw for connecting onto a mounting dummy rail (not shown) as it is done currently or onto the neutral bus bar 150 to secure the breaker in the final position. In pigtail neutral circuit breakers having a position-maintaining mounting clip, the mounting clip can be made of a non-electrically conductive material such as plastic. Alternately, the PON circuit breakers have an electrically conductive neutral mounting clip that electrically connects the circuit breaker to the neutral bus bar 150 and thereby to the load-side neutral 114.

The neutral bus bar 150 can reliably accommodate both wire connections and plug-on neutral connections of various types of circuit breakers. For example, as shown in FIG. 1, the neutral bus bar 150 includes a plurality of wire connectors 154 (or wire connection assemblies) and a plurality of plug-on neutral (PON) landing sections 156, which are distributed along a length of an elongated body 152 of the neutral bus bar. The elongated body 152 may be formed as a unitary piece or as multiple pieces to be assembled together. Each wire connector 154 is able to receive a neutral wire from a pigtail-type circuit breaker. Each PON landing section 156 is able to receive a neutral clip from a plug-on neutral type circuit breaker. The wire connectors 154 are segregated (e.g., separated) from the PON landing sections 156, and alternate with the PON landing sections 156. The neutral bus bar 150 is configured with at least one wire connector 154 between adjacent PON landing sections 156.

In this example, there are two wire connectors 154 arranged between any two adjacent PON landing sections 156. However, the neutral bus bar 150 can be configured with any number of wire connectors 154 between any two adjacent PON landing sections 156. Furthermore, the wire connectors 154 and the PON landing sections 156 may be arranged along a length of the neutral bus bar 150 in a repeating pattern. For instance, the pattern can be a combination of only one PON landing section 156 and one or more wire connectors 154. As shown in the example of FIG. 1, the neutral bus bar 150 has a pattern of a combination of one PON landing section 156 and two wire connectors 154, which is repeated along a length of at least a portion of the elongated body 152 of the neutral bus bar.

Furthermore, the PON landing sections 156 of the neutral bus bar 150 are distributed along a length of the elongated body 152 with a pitch spacing that corresponds to a pole spacing of circuit breakers connectable thereto on the electrical panel 100. For example, the pitch spacing between adjacent PON landing sections 156 matches or is aligned with the pole spacing of the circuit breakers connectable on the electrical panel 100, e.g., a centerline (C/L) spacing of PON landing sections=C/L spacing of poles of the circuit breakers=C/L spacing of the circuit breakers (e.g., ¾ inch, 1 inch, 1 and ½ inch, etc.). The pole spacing of the circuit breakers corresponds to the width of the circuit breakers to be used in the electrical panel 100. The pitch spacing of the PON landing sections 156 may or may not be aligned with the pole spacing of the stabs of the electrical panel 100, depending on the layout of the stabs, e.g. panel connectors 110, of the line buses on the electrical panel.

In the example of FIG. 1, the pattern of a combination of PON landing section 156 and wire connector(s) 154 is repeated with a pitch spacing that corresponds to the pole spacing of the circuit breakers connectable thereto on the electrical panel 100. For example, the pitching spacing of the pattern matches the pole spacing of circuit breakers connectable on the electrical panel 100. In FIG. 1, the neutral bus bar 150 is shown as a fully distributed neutral bus bar, i.e., the pattern runs the full length of the breaker poles within the electrical panel 100. However, the neutral bus bar 150 may also be configured as a partially distributed neutral bus bar, in which the pattern does not run to the end breaker pole on the electrical panel 100. A partially distributed neutral bus bar may include additional wire connectors (e.g., wire connectors 154) that are more tightly spaced along a length of the elongated body of the neutral bus bar or in an area above the breaker pole spaces after the neutral strap 113. For example, although the neutral bus bar 150 is shown as a fully distributed bus bar, the area on the bus bar above the breaker pole spaces after the neutral strap 113 is generally denoted by reference 130.

Figure 2:
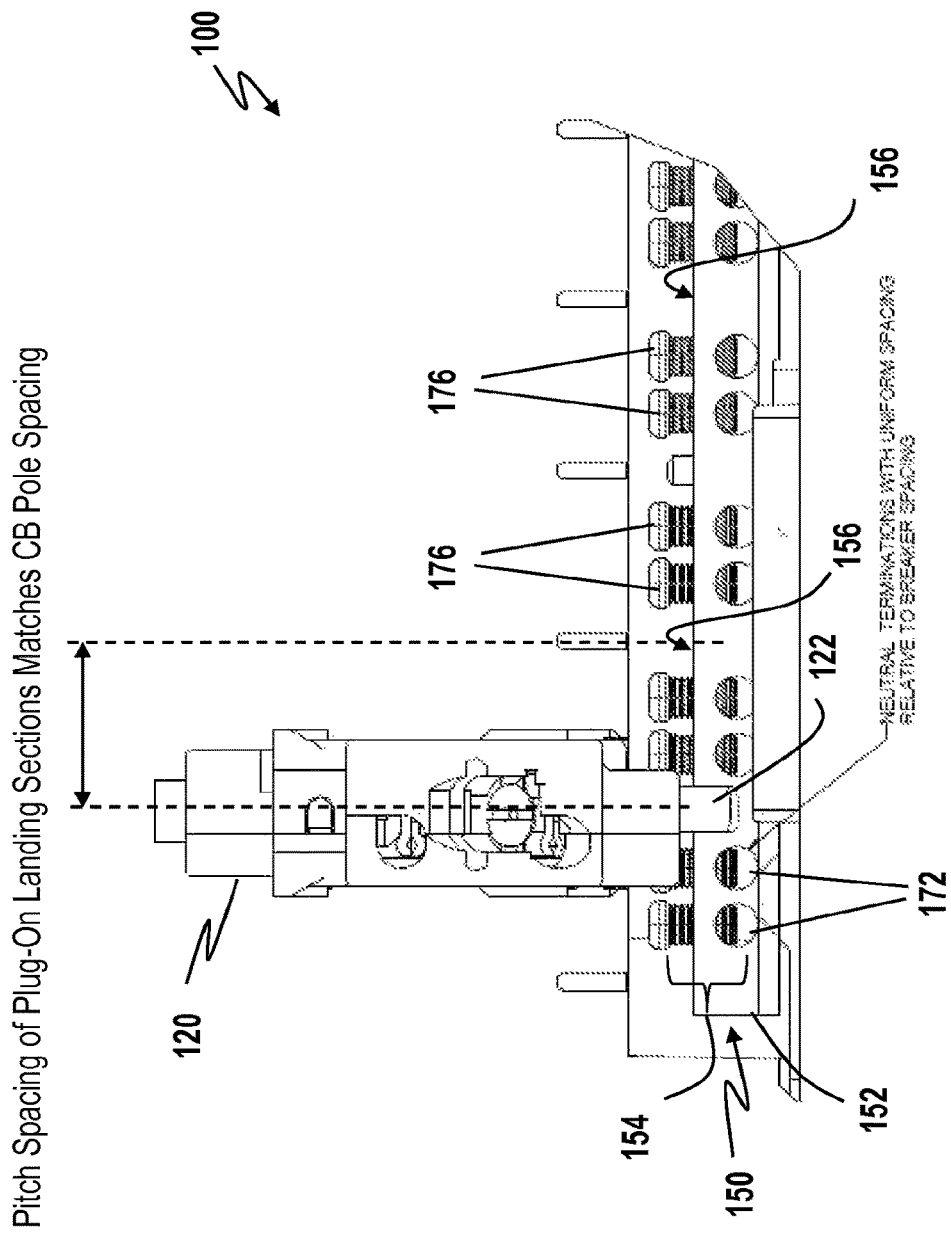
FIG. 2 illustrates a partial side view of one of the neutral bus bars on the electrical panel of FIG. 1 with PON landing sections distributed along a length of the neutral bus bar with a pitch spacing that corresponds to a pole spacing of circuit breaker connectable onto the electrical panel.

The spacing between the wire connectors 154 and PON landing sections 156 of the neutral bus bar 150 in relationship to the spacing of circuit breakers connectable on the electrical panel 100 is also shown in FIG. 2, which illustrates a partial side view of the electrical panel 100. In FIG. 2, the PON landing sections 156 are distributed along a length of the neutral bus bar 150 with a pitch spacing that matches the pole spacing of the circuit breakers connectable on the electrical panel 100. Furthermore, the pattern of the combination of one PON landing section 156 and two wire connectors 154 is also repeated with a uniform pitch spacing that matches the pole spacing of the circuit breakers. A circuit breaker 120 is shown with its plug-on neutral (PON) clip 122 connected over one of the PON landing sections 156 of the neutral bus bar 150.

FIGS. 3 and 4 show an enlarged perspective view of the neutral bus bar 150 with the elongated body 152. The elongated body 152 has a bottom portion (or base) 160, a middle portion 170 and a top portion 180. In this example, the neutral bus bar 150 has an I-shape cross-section with a flat and even top surface on the top portion 180. As used herein, "cross-section" or "cross-sectional", when used to describe a part of the body 152 of the neutral bus bar 150, refers to a cross-section of that part which is perpendicular to a length or elongation of a portion of the body 152. Furthermore, the top portion 180 has a cross-sectional width that is greater than a cross-sectional width of the middle portion 170. The elongated body 152 of the neutral bus bar 150 may also include through holes 158, which can be used to secure the neutral bus bar 150 onto the electrical panel 100, using screws or bolts or other fastening devices.

The elongated body 152 of the neutral bus bar 150 includes a plurality of the wire connectors 154 distributed along the length of at least a portion of the neutral bus bar 150. Each wire connector 154 includes a side hole 172 on the middle portion 170 of the body 152 and a corresponding top landing hole 184 (e.g., a wire landing hole) on the body 152. The side hole 172 is configured to receive a neutral wire, such as a pigtail neutral wire, from a wire type circuit breaker. The top landing hole 184 is threaded (e.g., a threaded bore) and receives a hold down screw 176, which is used to secure a neutral wire (not shown) received in the side hole 172 of the neutral bus bar 150. The top landing hole 184 includes a mouth which opens onto the top surface of the top portion 180 of the elongated body 152 of the neutral bus bar 150.

The elongated body 152 also includes a plurality of PON landing sections 156 distributed along a length of a top portion of the neutral bus bar 150. In this example, the PON landing section 156 is formed from a flat and even section on the top portion 180 of the neutral bus bar 150, which is able to receive a PON clip from a plug-on neutral type circuit breaker. The edges of the PON landing section 156 can be rounded or curved to improve connection of a clip over the section. As previously discussed, each PON landing section 156 is segregated from the wire connectors 154, particularly the top landing holes 184 of the wire connectors 154.

The wire connectors 154 and the PON landing sections 156 are distributed along a length of the elongated body 152 of the neutral bus bar 150, with one or more wire connectors 154 arranged between adjacent plug-on landing sections 156. As previously discussed, the neutral bus bar 150 has a repeating pattern of a combination of two wire connectors 154 and one PON landing section 156. A plug-on neutral type circuit breaker can be connected, via a PON clip, to a PON landing section 156 of the neutral bus bar 150, without having to remove any hold down screws 176 for the wire connectors 154 and without having to engage the PON clip over any hold down screw. The PON landing section 156 has a dimension (e.g., a width or surface area) that is sufficient to accommodate a PON clip of a plug-on neutral type circuit breaker. The width of the PON clip may be smaller than the width of the plug-on neutral type circuit breaker which it is attached to.

Operational examples for connecting a plug-on neutral type or a wire type circuit breaker onto the neutral bus bar 150 are discussed below with references to FIGS. 5 and 6 for a plug-on neutral type circuit breaker. As shown in FIGS. 5 and 6, a plug-on neutral type circuit breaker 120 includes a PON clip 122, which is made of a resilient and conductive material or materials. The PON clip 122 of the plug-on neutral type circuit breaker 120 can be positioned over a PON landing section 156 and pressed down onto the PON landing section so that the PON clip 122 is plugged onto and over the PON landing section 156. Since the wire connectors 154 are segregated from the PON landing section 156, the hold down screws 176 can occupy all of the top landing holes 184 of the wire connectors 154, as is the industry standard for ease of wiring, without having them interfere when plugging the PON clip 122. The rounded or curved edges of the PON landing section also provide for a better physical and electrical connection with the PON clip 122 of the plug-on neutral type circuit breaker 120.

As for wire type circuit breakers with a neutral wire (e.g., a pigtail-neutral circuit breaker 140), they can be installed in a well-known manner onto the electrical panel 100 of FIG. 1. For example, as part of the installation of the wire type circuit breaker onto the electrical panel 100, the neutral wire is connected to the neutral bus bar 150, such as via one of the wire connectors 154, as follows. The neutral wire of the wire type circuit breaker can be inserted through one of the side holes 172 on the elongated body 152. Thereafter, a hold down screw 176 can be screwed into a corresponding top landing hole 184 to hold down and connect the neutral wire to the neutral bus bar 150. The wire type circuit breaker can also include a protruding mounting clip (not shown), which can be plugged onto a mounting dummy rail to physically secure the breaker onto the electrical panel 100. The protruding mounting clip can be a non-conductive or plastic clip.

Figure 7:
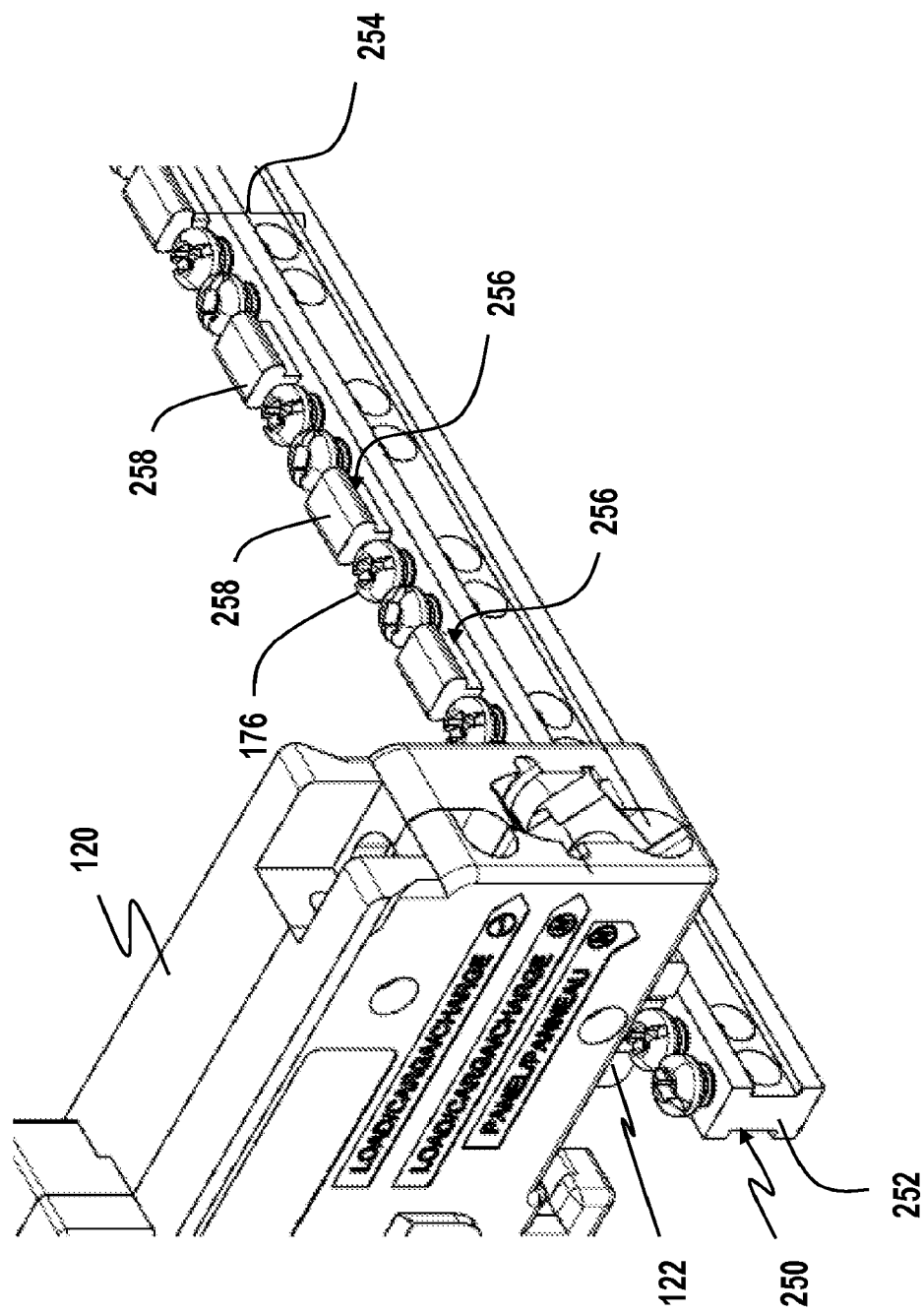
FIG. 7 illustrates a perspective view of an exemplary neutral bus bar with elevated PON landing sections and wire connectors, with the PON landing sections having a pitch spacing corresponding to a pole spacing of circuit breakers connectable onto an electrical panel in accordance with a second embodiment.

FIG. 7 illustrates another example of a neutral bus bar 250 with an elongated body 252 in accordance with a second embodiment of the present disclosure. As with the neutral bus bar 150 of FIG. 1, the neutral bus bar 250 also includes a top, middle and bottom portion, with at least one wire connector 254 arranged between adjacent plug-on neutral (PON) landing sections 256. The wire connector 254 may be similar or the same as the wire connector 154 (in FIG. 1), which includes a side hole 172 and a top landing hole 184 and desirably a hold down screw 176. In this example, there are two wire connectors 254 between adjacent elevated PON landing sections 256. The PON landing sections 256 are distributed along a length of the elongated body 252 with a pitch spacing that corresponds to the pole spacing of circuit breakers connectable onto an electrical panel, such as the electrical panel 100 of FIG. 1 as explained above.

Figure 8:
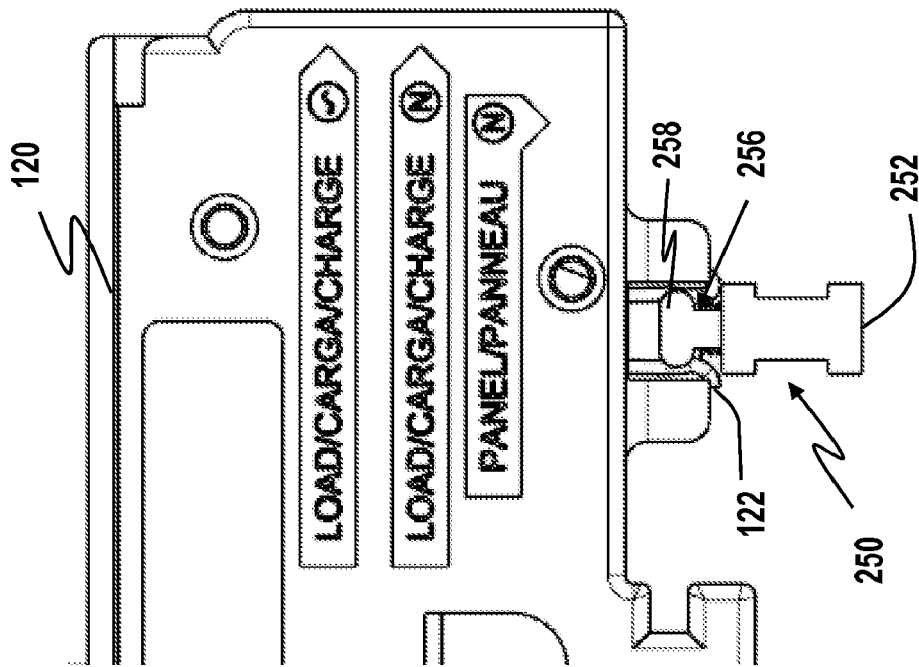
FIGS. 8 and 9 illustrate cross-sectional views along a length of the neutral bus bar of FIG. 7 without and with hold down screw(s) inserted in the wire connector(s).
Figure 9:
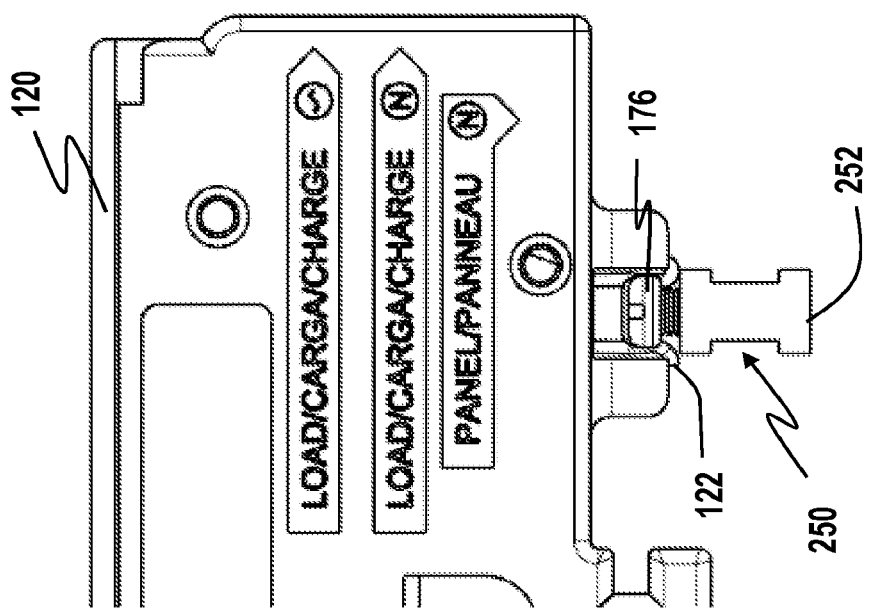

Each elevated PON landing section 256 includes an elevated platform 258 for receiving a PON clip from a plug-on neutral type circuit breaker. The elevated platform 258 of the PON landing section 256 has a T-shape in a cross-section perpendicular to a direction of body elongation. The elevated platform 258 may be centered or off-centered on the top portion of the elongated body 252 of the neutral bus bar 250. The elevated platform 258 also may have edges which are rounded or curved to improve physical and electrical connection of a PON clip from a plug-on neutral type circuit breaker onto the platform of the PON landing section 256. The height of the elevated platform 258 may be configured to rise above a hold down screw 176 when the screw is fully inserted into the top landing hole of a wire connector 254. FIGS. 8 and 9 show cross-sectional views along a length of the neutral bus bar 250 without and with hold down screw(s) 176 inserted in the wire connector(s) 254. As shown in these Figures, the PON clip 122 of a plug-on neutral type circuit breaker 120 can be connected over one of the T-shape PON landing sections 256 of the neutral bus bar 250.

The illustrated embodiments of the neutral bus bar (e.g., 150 and 250) are simply provided as examples. The size and shape of the PON landing sections on the neutral bus bar can be modified while retaining their functionality in accordance with the present disclosure. The pitch spacing of the PON landing sections of the neutral bus bar can be designed for use with any circuit breaker pole spacing, e.g., ¾ inch, 1 inch, 1 and ½ inch or a pole spacing for any known size (e.g., width) of circuit breaker on an electrical panel. Furthermore, the neutral bus bar may be configured with a repeating pattern of a combination of one PON landing section and one or more wire connectors. The number of wire connectors in the pattern may depend on the size of the pole spacing of the circuit breakers. The neutral bus bar may be molded, stamped and/or punched, and may be formed of a conductive material, such as copper, aluminum or any suitable conductive material or composition of materials depending on the application and the desired electrical specifications. Furthermore, the neutral bus bar may be formed as a unitary piece or as multiple pieces to be assembled together.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A neutral bus bar for use within an electrical distribution apparatus, comprising:
   an elongated body including:
      a plurality of wire connectors distributed along a length of the elongated body, each of the wire connectors including a side hole on the elongated body for receiving an electrical wire from a circuit breaker and a top landing hole on the elongated body for receiving a hold down screw to secure the received electrical wire in the side hole, the top landing hole opening onto a top surface of a top portion of the body, and
      a plurality of plug-on neutral landing sections distributed along the length of the top portion of the elongated body with a pitch spacing that corresponds to a pole spacing of circuit breakers connectable thereto on the electrical distribution apparatus, each plug-on neutral landing section configured to receive a plug-on neutral clip from a plug-on neutral type circuit breaker and segregated from the wire connectors, a wire connector from the plurality of wire connectors arranged between adjacent plug-on neutral landing sections on the elongated body,
   wherein a pattern of a combination of one plug-on neutral landing section and one or more wire connectors is repeated along a length of the elongated body with a pitch spacing that matches the pole spacing of circuit breakers connectable thereto on the electrical distribution apparatus so that each of the plurality of plug-on neutral landing sections is aligned with a different pole.

2. The neutral bus bar of claim 1, wherein the pattern consists of a combination of one plug-on neutral landing section and two wire connectors.

3. The neutral bus bar of claim 1, wherein the top surface of the top portion of the body comprises a flat and even surface.

4. The neutral bus bar of claim 1, wherein each plug-on neutral landing section includes an elevated platform for receiving a plug-on neutral clip from a plug-on neutral type circuit breaker.

5. The neutral bus bar of claim 1, wherein each plug-on neutral landing section on the top portion of the elongated body has rounded edges.

6. The neutral bus bar of claim 1, wherein the pitch spacing of the plug-on landing sections corresponds to the width of the circuit breakers.

7. An electrical panel comprising:
   a plurality of bus bars including a neutral bus bar, the neutral bus bar comprising:
      an elongated body including:
         a plurality of wire connectors distributed along a length of the elongated body, each of the wire connectors including a side hole on the elongated body for receiving an electrical wire from a circuit breaker and a top landing hole on the elongated body for receiving a hold down screw to secure the received electrical wire in the side hole, the top landing hole opening onto a top surface of a top portion of the body, and
         a plurality of plug-on neutral landing sections distributed along the length of the top portion of the elongated body with a pitch spacing that corresponds to a pole spacing of circuit breakers connectable thereto, each plug-on neutral landing section configured to receive a plug-on neutral clip from a plug-on neutral type circuit breaker and segregated from the wire connectors, a wire connector from the plurality of wire connectors arranged between adjacent plug-on neutral landing sections on the elongated body; and a plurality of the hold down screws inserted in the top landing holes of the wire connectors of the neutral bus bar, wherein a pattern of a combination of one plug-on neutral landing section and one or more wire connectors is repeated along the length of the elongated body with a pitch spacing that matches the pole spacing of circuit breakers connectable thereto so that each of the plurality of plug-on neutral landing sections is aligned with a different pole.

8. The electrical panel of claim 7, wherein the top surface of the top portion of the body comprises a flat and even surface.

9. The electrical panel of claim 7, wherein each plug-on neutral landing section includes an elevated platform for receiving a plug-on neutral clip from a plug-on neutral type circuit breaker.

10. The electrical panel of claim 7, wherein each plug-on neutral landing section on the top portion of the elongated body has rounded edges.

11. The electrical panel of claim 7, wherein the neutral bus bar is a fully distributed neutral bus bar.

12. The electrical panel of claim 7, further comprising a plurality of panel connectors, each of the plurality of plug-on neutral landing sections being associated with and connectable to a different one of the plurality of panel connectors across a pole of a circuit breaker.

13. The neutral bus bar of claim 1, wherein the pole spacing comprises an approximate distance between a centerline of adjacent poles of one or more circuit breakers connectable to the elongated body on the electrical distribution apparatus.

14. The electrical panel of claim 7, wherein the pole spacing comprises an approximate distance between a centerline of adjacent poles of one or more circuit breakers connectable on the elongated body.

15. The neutral bus bar of claim 1, wherein each of the plurality of plug-on neutral landing sections is aligned with a pole of a circuit breaker connectable thereto.

16. The electrical panel of claim 7, wherein each of the plurality of plug-on neutral landing sections is aligned with a pole of a circuit breaker connectable thereto.

17. An electrical panel comprising:
a plurality of bus bars including a neutral bus bar, the neutral bus bar comprising:
an elongated body including:
a plurality of wire connectors distributed along a length of the elongated body, each of the wire connectors including a side hole on the elongated body for receiving an electrical wire from a circuit breaker and a top landing hole on the elongated body for receiving a hold down screw to secure the received electrical wire in the side hole, the top landing hole opening onto a top surface of a top portion of the body, and
a plurality of plug-on neutral landing sections distributed along the length of the top portion of the elongated body, each plug-on neutral landing section configured to receive a plug-on neutral clip from a plug-on neutral type circuit breaker and segregated from the wire connectors, one or more of the wire connectors from the plurality of wire connectors arranged between adjacent plug-on neutral landing sections on the elongated body, the plurality of plug-on neutral landing sections comprising at least three plug-on neutral landing sections and having a pitch spacing so that each of the plurality of plug-on neutral landing sections is aligned with a different pole from a plurality of poles of circuit breakers connectable to the elongated body; and
a plurality of the hold down screws inserted in the top landing holes of the wire connectors of the neutral bus bar.

18. The electrical panel of claim 17, further comprising a plurality of panel connectors, each of the plurality of plug-on neutral landing sections being associated with and connectable to a different one of the plurality of panel connectors across a pole of a circuit breaker.

19. The electrical panel of claim 17, wherein the pitch spacing matches the pole spacing of circuit breakers connectable thereto, and the pole spacing comprises an approximate distance between a centerline of adjacent poles of one or more circuit breakers connectable to the elongated body.

20. The electrical panel of claim 17, wherein each of the plurality of plug-on neutral landings is aligned with a pole of a circuit breaker connectable thereto.

* * * * *